United States Patent [19]

Madsen

[11] 4,333,027

[45] Jun. 1, 1982

[54] GAS-COOLED ROTOR FOR TURBO-GENERATOR

[75] Inventor: Kristian D. Madsen, Västerås, Sweden

[73] Assignee: ASEA Aktiebolag, Västerås, Sweden

[21] Appl. No.: 229,919

[22] Filed: Jan. 30, 1981

Related U.S. Application Data

[63] Continuation of Ser. No. 964,395, Nov. 29, 1978, abandoned.

[30] Foreign Application Priority Data

Nov. 30, 1977 [SE] Sweden .................. 7713540

[51] Int. Cl.³ .............................................. H02K 1/32
[52] U.S. Cl. ........................................ 310/61; 310/45; 310/214
[58] Field of Search .................. 310/64, 65, 55, 58, 310/60, 61, 59, 194, 214, 215, 269, 52, 42–45

[56] References Cited

U.S. PATENT DOCUMENTS

| | | | |
|---|---|---|---|
| 2,728,001 | 12/1955 | Gunthardt | 310/64 |
| 2,749,457 | 6/1956 | Kilner | 310/64 |
| 2,760,091 | 8/1956 | Barlow | 310/61 |
| 2,783,399 | 2/1957 | Fenemore | 310/64 |
| 2,920,219 | 1/1960 | Beckwith | 310/64 |
| 3,119,033 | 1/1964 | Horsley | 310/64 |
| 3,781,581 | 12/1973 | Lehuen | 310/61 |
| 3,952,406 | 4/1976 | Madsen | 310/42 |
| 4,282,450 | 8/1981 | Eckels | 310/61 |

FOREIGN PATENT DOCUMENTS

508068 9/1930 Fed. Rep. of Germany ...... 310/214

*Primary Examiner*—R. Skudy
*Attorney, Agent, or Firm*—Pollock, Vande Sande & Priddy

[57] ABSTRACT

A gas-cooled rotor assembly for use with a turbogenerator type device, wherein a coil side is positioned within a winding slot formed in the rotor core, such that a pair of cooling channels extend between opposite sides of the coil side and adjacent wall portions of the winding slot. Positioning devices of insulating material are positioned adjacent to radially inner-most and outer-most end portions of the coil side, with the positioning devices electrically insulating the coil side from confronting surface portions of the slot walls, while at the same time transmitting tangential forces therebetween.

13 Claims, 2 Drawing Figures

GAS-COOLED ROTOR FOR TURBO-GENERATOR

This is a continuation of application Ser. No. 964,395, filed 11-29-78, now abandoned.

BACKGROUND OF THE INVENTION

The present invention generally relates to a turbogenerator assembly of the type including a rotor core with radial winding slots and a separate coil side with winding turns located in each winding slot and insulated from each other. In particular, the present invention is directed to a novel rotor assembly construction which creates axially extending cooling channels between each coil side and adjacently disposed wall surfaces of a surrounding winding slot allowing a cooling gas to flow through the rotor assembly.

Prior art turbo-generator rotor assemblies generally provide a relatively thick coil insulation about the conductor bundle of the coil side, as shown in German Patentschrift N. 508068 published Sep. 24, 1930. Such coil insulation acts to reduce considerably the ability of the coil side to give off heat since coil insulation generally is made to endure the maximum potential between the rotor winding and the rotor core, and has a thickness substantially greater than that of the insulation between two adjacent coil turns.

Both the coil side and the surrounding coil insulation are shown in one embodiment of German Patentschrift N 508068 as being mounted in a longitudinal slot formed in the slot wedge member. This construction has proven less than completely satisfactory, in that large and fluctuating tangential forces which effect the coil side during operation of the rotor tend to break down and destroy the coil insulation located between the copper of the coil side and the metallic slot wedge. If the longitudinal slot is made with increased depth in order to provide greater surfaces for receiving tangential forces, this greatly increases the difficulty of inserting the slot wedge since the bent portions of the coil located outside the slot provide a blocking effect.

A further embodiment of German Patentschrift N 508068 suggests fixing the tangential position of the coil side and insulation by mounting each within a metallic holder which is provided with an axially extending ridge that is fitted into a corresponding slot formed on an inner surface of the slot wedge. This assembly also has proven less than satisfactory, in that an increase in the radial dimension of the slot wedge necessary for mounting the metallic holder correspondingly reduces the available coil space. Furthermore, the space occupied by the metallic holder itself reduces the space available for conductor material and insulation.

As will be discussed in detail hereafter, the present invention solves each of the above discussed problems confronting known prior art assemblies, while at the same time providing an efficient gas-cooled rotor assembly which significantly increases the available coil space of the rotor.

OBJECTS OF THE PRESENT INVENTION

An object of the present invention is to provide a rotor core for use in a turbo-generator type device, wherein the rotor coil sides are fixed against motion in tangential directions by radially inner and outer positioning devices.

A further object of the present invention is to provide a rotor core assembly wherein axially extending cooling channels are formed between the coil sides and adjacent wall surfaces of the winding slot to allow a cooling gas to flow through the rotor.

A further object of the present invention is to provide a novel rotor core assembly, wherein coil surfaces facing the cooling channels have no need for heat insulative lining and the winding turns of the coil side are locked to each other via a plurality pin-shaped locking members embedded in the coil side and positioned between parallel, limiting planes of adjacent turns comprising the coil side.

Each of these and other objects of the present invention will become apparent from a reading of the following specification and claims, together with the accompanying drawings, wherein similar elements are referred to and are indicated by similar reference numerals.

BRIEF DESCRIPTION OF THE DRAWINGS

The present invention can be best understood with reference to the accompanying drawings, wherein.

DETAILED DESCRIPTION OF THE PREFERRED EMBODIMENTS

Figure 1:
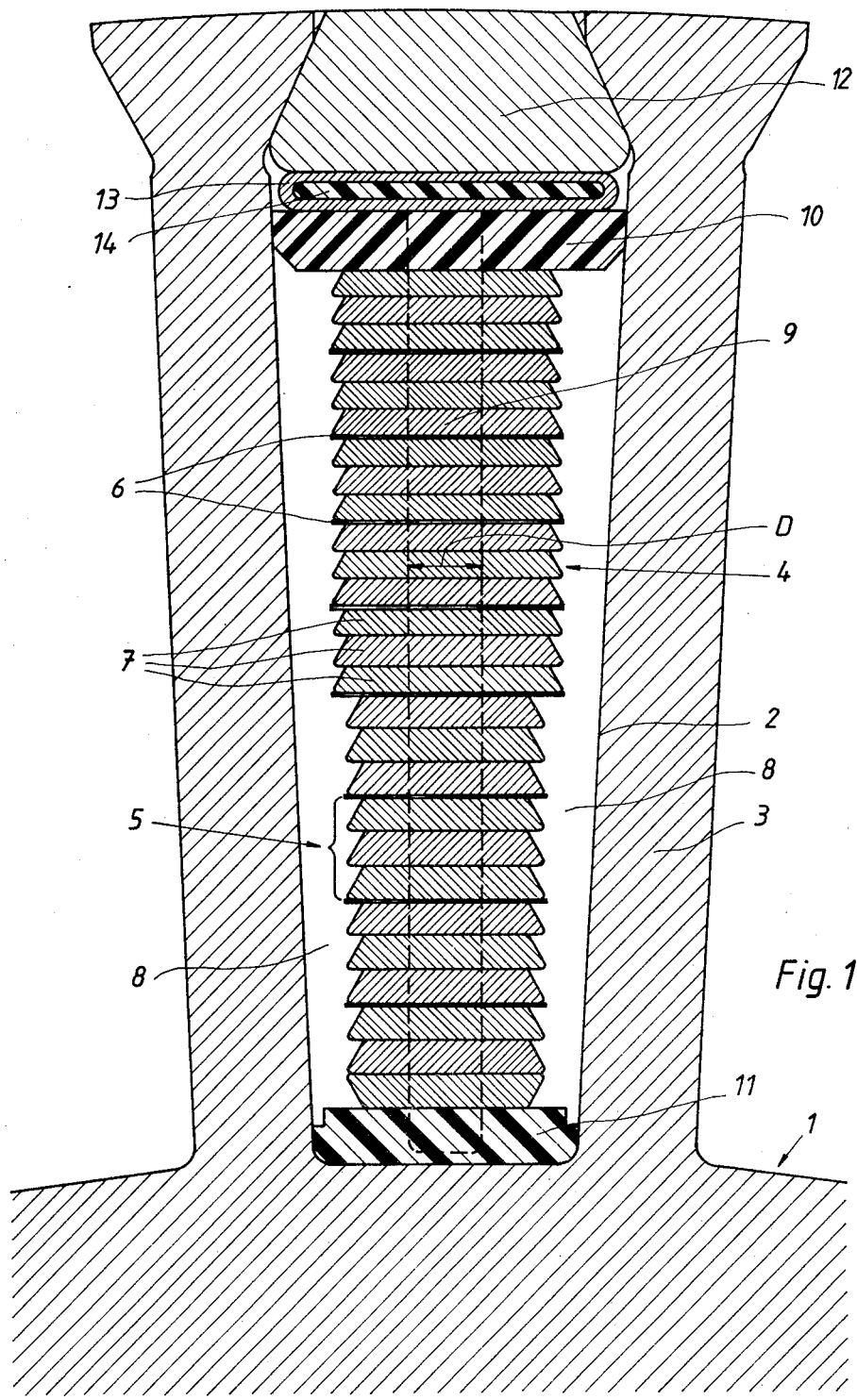
FIG. 1 shows a schematic representation of a partial radial section through a motor formed in accordance with a preferred embodiment of the present invention.

Referring to the drawings, and FIG. 1 in particular, a solid rotor core 1 includes a winding slot 2 formed by a pair of intermediate teeth 3. While only a single winding slot 2 is shown in FIG. 1, it is to be understood that rotor core 1 includes a plurality of separate winding slots each constructed in a substantially similar manner and have, therefore, been left out of the drawing for purposes of clarity.

Winding slot 2 retains a coil side generally indicated at 4, which coil side 4 includes nine turns 5. Each turn 5 comprises a bundle of three parallel copper bars 7, with a separate layer of insulation 6 lying in a tangential plane between adjacent turns 5. The side surfaces of individual bars 7 which face the slot walls 2 have been left uninsulated. A pair of separate cooling channels 8 each extend axially between opposite sides of coil side 4 and confronting walls of winding slot 2. During operation, a cooling gas is caused to flow through cooling channels 8 to dissipate heat generated by coil side 4.

Each of the copper bars 7 includes at least one through aperture of diameter D, with the apertures of adjacent bars 7 being aligned with one another. A locking pin 9 extends radially through the aligned apertures in copper bars 7 in order to prevent relative tangential displacement between the copper bars 7. It is noted that each copper bar 7 may include a plurality of apertures, with apertures in adjacent bars 7 aligned to allow insertion of a corresponding plurality of radially extending locking pins 9. Each pin 9 is formed of insulating material.

Coil side 4 is fixed against undesirable movement in a tangential direction by separate, radially outer and radially inner positioning device as shown by plates 10 and 11, respectively. Each plate 10 and 11 is formed of a rigid, electrically insulating material and each plate 10 and 11 also makes abutting contact with the walls of winding slot 2. Furthermore, plate 10 is formed with at least one aperture which is aligned with a set of apertures extending through bars 7 and is further aligned with a corresponding aperture formed in plate 11. This allows a locking pin member 9 to extend completely through coil side 4 and into plates 10 and 11, so that tangential forces are transmitted between the walls of winding slot 2 and the coil side 4 via pin 9.

A metallic slot wedge 12 is positioned beyond an outer radial surface of insulating plate 10, with a pressure bar 13 of soft metal, such as copper, compressed between metallic slot wedge 12 and plate 10. Pressure bar 13 enclosures a body of epoxy resin 14 which is injected into an opening formed through pressure bar 13 and cured under high pressure.

The preferred embodiment described hereabove is effectively cooled by the flow of cooling gas through channels 8. Furthermore, as stated above, the unique arrangement of spacing plates 10 and 11 makes it possible to safely transmit tangentially directed forces from the walls of winding slot 2 to coil side 4 via locking pins 9, while at the same time electrically insulating the slot walls from coil side 4. The plates 10 and 11 together are capable of transferring the entire tangential force acting on the coil side upon possible accelerations and decelerations.

Figure 2:
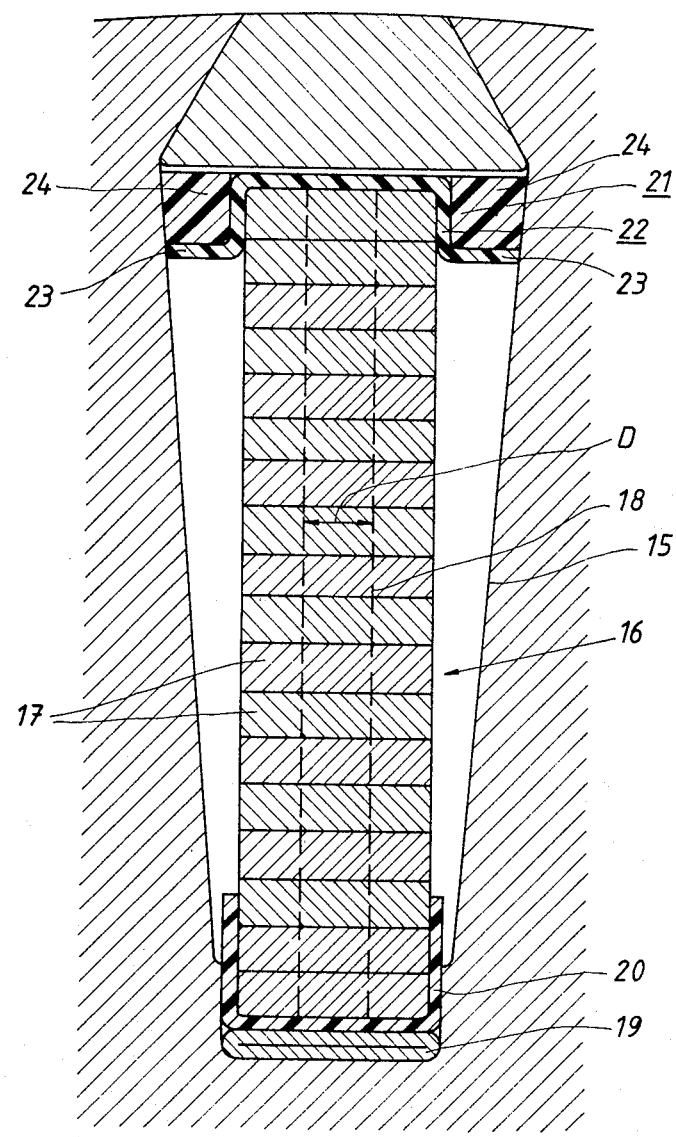
FIG. 2 shows a schematic representation of a partial radial section through a motor formed in accordance with an alternative, preferred embodiment of the present invention.

A further, preferred embodiment is schematically represented in FIG. 2, wherein a winding slot 15 supports a coil side 16 positioned therein. Coil side 16 comprises a plurality of separate copper bars 17. Each intermediate turn of coil side 16 is comprised of a single copper bar 17, with the radially inner-most and outer-most turns each including a pair of parallel-connected bars 17 to compensate for the relatively poor cooling effect of the inner-most and outer-most turns. The copper bars 17 are each provided with at least one through extending aperture of a diameter D, with the apertures extending through adjacent bars 17 being aligned relative to one another. A radially directed locking pin 18 formed of insulating material extends through the aligned apertures formed through bars 17. As with the preceding embodiment, it is considered within the scope of the present invention to form a plurality of apertures of diameter D through each bar 17, with each of the apertures formed in a bar 17 being aligned with respective apertures formed in an adjacent bar 17. A separate, radially directed locking pin 18 extends through each stack of aligned apertures, with each locking pin 18 being formed of insulating material.

The cross-section of winding slot 15 deviates from the cross-section of winding slot 2 shown in FIG. 1, in that the radially inner portion of winding slot 15 is formed with slot walls extending parallel to one another. A channel-shaped holder 20 formed of insulating material surrounds the radially inner-most end of coil side 16 and is compressed between opposite sides of coil side 16 and the parallel extending wall portions of winding slot 15. Furthermore, a pressure tube 19 is arranged at the inner-most portion of winding slot 15 between the slot wall and holder 20, as shown in FIG. 2. Holder 20 functions to fixedly position the inner-most turn of coil side 16 in winding slot 15, while at the same time transmitting tangential forces therebetween.

A spacing positioning device 21 functions to fixedly position the outer-most turn of coil side 16 in winding slot 15. Specifically, positioning device 21 comprises a holder 22 formed of rigid insulating material which includes a channel-shaped middle portion and a pair of flange-shaped portions 23 formed on either end thereof. Holder 22 surrounds the outer-most end of coil side 16 with flange shaped portions 23 extending into abutting contact with wall portions of winding slot 15. A pair of elongated spacing bodies 24 are positioned on opposite sides of coil side 16 from one another with each spacing body 24 compressed by contact with the changed-shaped middle portion and the flange shaped portions 23 of holder 22 as well as the adjacent wall portion of winding slot 15. As a result, positioning device 21 is capable of transmitting tangential forces between the walls of winding slot 15 and the radially outer-most turn of coil side 16. The device 20 and 21 are together capable of transmitting the entire tangential force acting on the coil side upon possible accelerations or decelerations.

The present invention is not to be limited to the above-described embodiments, but is intended to include further modifications to the rotor core which are within the scope of the present invention. For example, the locking pins 9 and the corresponding apertures formed in the bars 7 can be made with a cross-section having an axial dimension greater than its tangential dimension, and instead of long locking pins, relatively short locking bodies can be used, for example so short that each locking body is acting on a pair of adjacent turns only, and can be disposed in two apertures which are facing each other, but not necessarily made as through-holes. Each of the turns in a coil side has to be furnished with at least one aperture for the adoption of a smaller or greater fraction of a corresponding locking body. If only through-aperture are used, one aperture for each turn of a coil side may be sufficient. Otherwise, some or all of the turns of a coil side has to be furnished with at least two apertures. Generically speaking, each possible pair of adjacent turns in a coil side is furnished with two radially aligned apertures, the apertures facing each other and being substantially filled by at least part of one and the same locking body of insulating material. Further, each holder 22 can be formed of two or more separate sections which join one another along planes extending through winding slot 15. Furthermore, it is considered within the scope of the present invention to provide radially aligned apertures through flanges 23 and spacing bodies 24 to release cooling gas which is introduced from the rotor ends into cooling channels formed between opposite sides of coil side 16 and adjacent walls of winding slot 15.

Finally, it is considered within the scope of the invention to furnish the uncovered surfaces of the coil sides shown in the drawings with a covering of electrical insulation, provided the thickness of such a covering is substantially smaller than the thickness of the coil insulation generally enclosing each coil side in a conventional turbo-rotor. When such a covering is used in a rotor according to our application, the covering should have a thickness which is substantially smaller than the thickness of an insulation dimensioned to endure the electrical potential difference between the winding and the iron core of the rotor.

If coil side surface portions not covered by fixable positioning members, for example 10, 11, 20, 22, are furnished with any insulating covering, this should preferably have a thickness smaller than the thickness of the turn insulation disposed between adjacent turns in the coil side. With the rotors shown in FIGS. 1 and 2, about 35 per cent and 21 per cent, respectively, of the total coil side surface is furnished with insulation capable of enduring the maximum electrical potential that may occur between the rotor winding and the rotor core, during testing and normal operation, and all other coil side portions are uninsulated. With a rotor according to our invention, an improved heat transmission is available as long as the percentage of the total surface area of the coil side furnished with this kind of insulation is chosen smaller than 70 per cent, but preferably this percentage should be smaller than 50 per cent.

The present invention is intended to be limited only by the scope of the following claims.

I claim:

1. An improved gas-cooled rotor assembly employed in a turbo-generator or the like, and comprising:
   a rotor core including at least one pair of spaced wall portions defining a winding slot therebetween with a metallic slot wedge extending between said spaced wall portions;
   a coil side positioned within said winding slot, said coil side comprising a plurality of conductor portions stacked one upon the other with adjacent planar faces extending perpendicular to an axial plane passing through the winding slot, each pair of adjacent planar faces having an intermediate layer of coil insulation;
   said coil side further including opposite side portions spaced from said wall portions of said winding slot, thereby creating axially extending cooling passageways between said coil side and the side walls of said winding slot;
   radially aligned apertures extending through said conductor portions and said layers of coil insulation extending between said conductor portions, said apertures disposed for receiving a pin-shaped locking member therethrough to prevent tangential separation of said conductor portions from one another;
   first and second positioning devices each including insulating material and positioned adjacent to radially outermost and radially innermost conductor portions of said coil side, each of said positioning devices extending beyond opposite sides of said coil side into pressure transmitting engagement with the wall portions of said winding slot for transmitting tangentially directed forces between the wall portions and said coil side;
   a metallic pressure bar formed of a solidified pressure medium disposed in said winding slot between said first positioning device and said metallic slot wedge for maintaining sufficient radial pressure against said coil side so as to prevent movements of said conductor portions in a radial direction;
   whereby electrical insulation dimensioned to endure the potential difference between the rotor winding and rotor core is applied to less than 70 percent of the total surface area of said coil side.

2. A gas-cooled rotor assembly according to claim 1, wherein each of said first and second positioning devices includes a separate rigid plate of insulative material.

3. A gas-cooled rotor assembly according to claim 1, wherein said pin-shaped locking member is formed of insulative material and includes a pair of opposite end portions extending into openings formed in said first and second positioning devices, respectively.

4. An improved gas-cooled rotor assembly employed in a turbo-generator or the like, comprising:
   a rotor core including at least one pair of spaced wall portions defining a winding slot therebetween with a metallic slot wedge extending between said spaced wall portions;
   a coil side positioned within said winding slot, said coil side comprising a plurality of conductor portions stacked one upon the other with adjacent planar faces extending perpendicular to an axial plane passing through the winding slot, each pair of adjacent planar faces having an intermediate layer of coil insulation;
   said coil side further including opposite side portions spaced from said wall portion of said winding slot, thereby creating axially extending cooling passageways between said coil side and the side walls of said winding slot;
   radially aligned apertures extending through said conductor portions and said layers of turn insulation extending between said conductor portions, said apertures disposed for receiving a pin-shaped locking member therethrough to prevent tangential separation of said conductor portions from one another;
   first and second positioning devices each including insulating material and positioned adjacent to radially outermost and radially innermost conductor portions of said coil side, each of said positioning devices extending beyond opposite sides of said coil side into pressure transmitting engagement with the wall portions of said winding slot for transmitting tangentially directed forces between the wall portions and said coil side;
   a metallic pressure bar positioned between said contacting a surface of said second positioning device and a confronting surface of a bottom wall portion of said winding slot;
   whereby electrical insulation dimensioned to endure the potential difference between the rotor winding and rotor core is applied to less than 70 percent of the total surface area of said coil side.

5. An improved gas-cooled rotor assembly employed in a turbo-generator or the like, and comprising:
   a rotor core including at least one pair of spaced wall portions defining a winding slot therebetween with a metallic slot wedge extending between said spaced wall portions;
   a coil side positioned within said winding slot, said coil side comprising a plurality of conductor portions stacked one upon the other with adjacent planar faces extending perpendicular to an axial plane passing through the winding slot, each pair of adjacent planar faces having an intermediate layer of coil insulation;
   said coil side further including opposite side portions spaced from said wall portions of said winding slot, thereby creating axially extending cooling passageways between said coil side and the side walls of said winding slot;
   radially aligned apertures extending through said conductor portions and said layers of turn insulation extending between said conductor portions, said apertures disposed for receiving a pin-shaped locking member extending therethrough to prevent tangential separation of said conductor portions from one another;
   first and second positioning devices each including insulating material and positioned adjacent to radially outermost and radially innermost conductor portions of said coil side, each of said positioning devices extending beyond opposite sides of said coil side into pressure transmitting engagement with the wall portions of said winding slot for transmitting tangentially directed forces between the wall portions and said coil side;

metallic pressure bar means confronting one of said first and second positioning devices for maintaining sufficient radial pressure against said coil side so as to prevent movement of said conductor portions in a radial direction;

whereby electrical insulation dimensioned to endure the potential difference between the rotor winding and rotor core is applied to less than 70 percent of the total surface area of said coil side.

6. A gas-cooled rotor assembly according to claim 5, wherein a plurality of pin-shaped locking members each extends through arespective set of aligned apertures formed in the stacked conductor portions of said coil side, said pin-shaped locking members each further extending into apertures formed in surfaces of said positioning devices abutting radial outermost and radial innermost portions of said coil side.

7. A gas-cooled rotor according to claim 5, wherein said pressure bar means comprises a metallic pressure bar positioned between a surface of said first positioning device and a confronting surface of a bottom wall portion of said winding slot, said metallic pressure bar including an opening containing a solidified pressure medium.

8. A gas-cooled rotor according to claim 7. wherein said metallic pressure bar includes an opening containing a solidified quantity of epoxy resin.

9. A gas-cooled rotor assembly according to claim 7, wherein at least one pin-shaped locking member formed of insulating material extends through a plurality of aligned apertures extending through said conductor portions forming said coil side, said pin-shaped locking member having an end portion extending into an aligned aperture formed in a surface of said second rigid plate abutting the radially innermost portion of said coil side.

10. A gas-cooled rotor assembly according to claim 5, wherein said second positioning device comprises a member having a channel-shaped cross-section making contact with opposite side portions of said coil side and a radially innermost end surface of said coil side.

11. A gas-cooled rotor assembly according to claim 5, wherein said first positioning device comprises an elongated, axially extending holder member of insulating material, said holder member including a channel-shaped middle portion and a pair of elongated flange-shaped end portions attached to opposite sides of said midddle portion, said flange-shaped end portions abutting opposite wall portions of said winding slot.

12. A gas-cooled rotor assembly according to claim 10, wherein said first positioning device further comprises a pair of elongated spacing bodies, each elongated spacing body being positioned in abutting contact with said middle portion of said holder, one of said elongated flange-shaped end portions and an adjacent wall portion of said winding slot, whereby said elongated spacing bodies compressibly maintain said coil side within said winding slot, while at the same time transmitting tangential forces therebetween.

13. A gas-cooled rotor assembly according to claim 5, wherein said pressure bar means comprises a metallic pressure bar containing a solidified pressure medium, said metallic pressure bar being disposed in said winding slot between said first positioning device and said metallic slot wedge for maintaining sufficient radial pressure against said coil side so as to prevent radial movements of said conductor portions.

* * * * *